United States Patent [19]

Pfefferle

[11] 4,402,662

[45] Sep. 6, 1983

[54] THERMAL SHOCK RESISTANT SPLIT-CYLINDER STRUCTURES

[75] Inventor: William C. Pfefferle, Middletown, N.J.

[73] Assignee: Government of the United States as represented by the Environmental Protection Agency, Washington, D.C.

[21] Appl. No.: 149,542

[22] Filed: May 13, 1980

[51] Int. Cl.³ .............................. F23D 3/40; F02G 7/26
[52] U.S. Cl. .......................................... 431/7; 431/268;
431/326; 431/327; 252/477 R; 60/39.06;
60/299; 60/723; 60/39.822
[58] Field of Search ................. 431/7, 268, 326, 327;
422/181, 182; 60/723, 39.06, 39.82 C, 295, 299,
300, 301, 302; 252/477 R

[56] References Cited

U.S. PATENT DOCUMENTS

| 1,893,372 | 1/1933 | Kryzanowsky | 60/300 X |
| 2,941,361 | 6/1960 | Spalding | 60/39.82 C |
| 3,887,741 | 6/1975 | Dwyer | 252/477 R X |
| 3,928,961 | 12/1975 | Pfefferle | 431/7 X |
| 3,994,831 | 11/1976 | Betz | 252/477 R X |
| 4,047,877 | 9/1977 | Flanagan | 431/8 |
| 4,076,888 | 2/1978 | Perugini et al. | 427/34 X |
| 4,280,329 | 7/1981 | Rackley et al. | 60/754 |

Primary Examiner—Larry Jones

[57] ABSTRACT

Thermal shock resistant catalytic monolithic structures are described comprising split-cylinders with flow-through passages. Such structures are especially useful as combustor catalysts and their use in catalytic combustors permits much more rapid start-up and cool down than with conventional monolithic catalysts.

8 Claims, 2 Drawing Figures

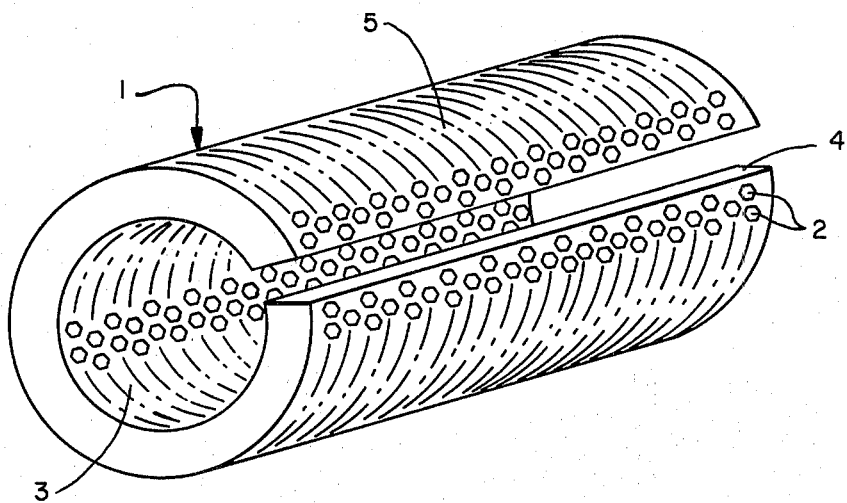
FIG.—1
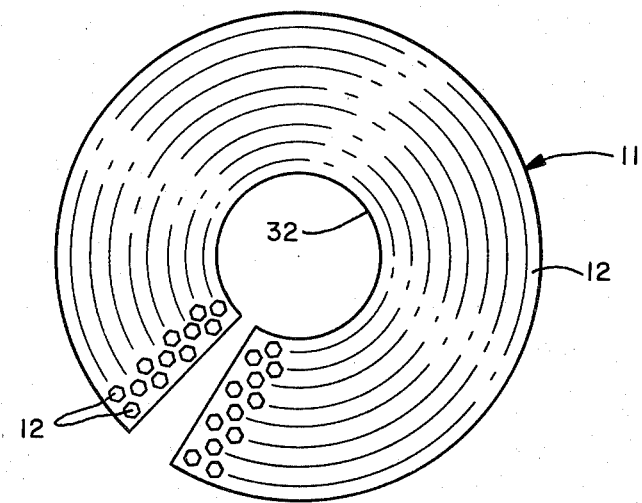
FIG.—2

THERMAL SHOCK RESISTANT SPLIT-CYLINDER STRUCTURES

The invention described herein was made in the course of, or under a contract, with the Environmental Protection Agency.

The present invention relates to the design of practical combustors utilizing ceramic catalysts. A serious limitation on the use of monolithic catalysts in catalytic combustors is that ceramic materials tend to fail when subjected to large variations in operating temperatures. This severely restricts the use of such catalysts in many combustor applications since rapid cycling of combustion temperature is often required in combustors such as those for gas turbines. Present catalytic combustor designs typically require ceramics which possess a greater thermal shock resistance than is available from high temperature ceramics.

It is an object of this invention to provide a method and apparatus for combustion of fuels over a catalyst which allows cycling of the combustion temperature at rates equivalent to those experienced by conventional thermal combustors.

It is further an object of this invention to provide a catalytic reactor which is not damaged by rapid heating or cooling.

Another object is to provide catalyst structures and methods of use which obviate thermal shock problems.

The invention in summary includes a method and catalyst structure in which the catalyst is a monolithic structure in the form of a split-cylinder with flow-through passages.

FIG. 1 is a perspective view of a radial flow split cylinder catalytic monolith in accordance with one embodiment of the present invention.

FIG. 2 is a cross section of an axial flow split cylinder catalytic monolith in accordance with another embodiment of the present invention.

As will be explained, catalytic structures according to the present invention are inherently resistant to thermal shock because the free movements permitted tend to relieve thermally generated stresses. It is believed, for example, that the "C" shaped split cylinder configurations behave much like a bimetallic strip of similar shape. Catalytic combustors using catalyst structures of the present invention are surprisingly resistant to thermal shock.

Referring to the drawings, FIG. 1 shows a catalytic monolith I formed in a hollow cylindrical shape with a plurality of radial flow passages 2. The cylinder is split along the length of one side by a slot 4. The split or open cylinder configuration avoids the damage resulting from temperature difference between the internal portion 3 and the external portion 5. With this configuration axial temperature gradients are not a problem and severe gradients can be tolerated even with a material such as stabilized zirconia.

FIG. 2 shows another embodiment comprising a hollow cylindrical catalytic monolith 11 with a plurality of axial flow passages 12. Temperature differences between the internal portion 32 and the exterior portion 12 are readily tolerated with this design.

The structure of both embodiments may be employed in catalytic combustors operating under conditions as specified in U.S. Pat. No. 3,928,961.

EXAMPLE

The catalytic structures of the invention are comprised of a catalytic ceramic material formed into the split cylinder configuration with flow-through passages having cell walls no thicker than about 0.002 inches (20 mils). Foam ceramics technology, for example as described in U.S. Pat. No. 4,076,888, is especially advantageous in making the curved shapes of the present invention. The unique combination of thin flow passage walls and stress-relieving curved shapes described in the present invention results in catalyst structures which, unlike conventional catalytic monoliths, are extremely resistant to thermal shock damage. The catalyst of the structure can be a ceramic of the spinel type, or a high melting catalytically active ceramic. Ceramics with a high coefficient of thermal expansion, such as a nickel doped stabilized zirconia, may be used. Accordingly, a ceramic may be selected primarily on the basis of its high temperature and catalytic properties. Magnesium chrome spinels and lanthanum chrome spinels are particularly useful catalytic ceramics in the invention.

For catalytic combustors, the radial flow split cylinder is especially advantageous in that it permits designs with very low catalyst flow through velocities yet with much higher approach velocities. Thus, such designs can handle extremely low flows without flashback and yet handle large flows without flame-out.

The invention has been described in detail with reference to specific preferred embodiments thereof, but it will be understood that variations and modifications can be effected within the spirit and scope of the invention.

What is claimed is:

1. A method of catalytically burning fuels which obviates the effects of thermal shock on a catalytic structure, including the steps of passing a mixture of fuel and air over a monolithic catalyst structure in the configuration of a hollow cylinder comprised of a plurality of cells having integral walls with the cells defining radially extending flow-through passages and having a slot axially extending along the length of one side of the cylinder with the slot penetrating completely through the side thickness of the cylinder, directing a flow of the mixture into and through the passages, and catalytically combusting the mixture flowing through the passages with the slot enabling the cylinder to be unrestrained to change shape under thermal expansion and contraction for minimizing thermally-generated stresses within the structure.

2. The method of claim 1 in which said catalyst is a catalytically active ceramic oxide of the spinel type.

3. The method of claim 1 in which said catalyst is a high melting catalytically active ceramic.

4. A catalytically active structure for combusting fuels to obviate the effects of thermal shock on the structure, comprising a catalytically active monolithic structure in the configuration of a hollow cylinder comprised of a plurality of cells having integral walls with the cells defining radially extending flow-through passages, means for forming a slot axially extending along the length of one side of the cylinder and penetrating completely through the side thickness of the cylinder with the slot enabling the cylinder to be unrestrained to change shape under thermal expansion and contraction during catalytic combustion of a mixture of fuel and air flowing through the passages for minimizing thermally-generated stresses within the structure.

5. The structure of claim 4 in which said catalyst is a catalytically active ceramic oxide of the spinel type.

6. A combustor for catalytically burning fuels to obviate the effects of thermal shock on a catalytic structure, comprising the combustion of a catalytically active monolithic structure in the configuration of a hollow cylinder, means for forming a plurality of cells in the cylinder with the cells having integral walls which define flow-through passages radially extending through the cylinder about its periphery, means for forming a slot axially extending along the length of one side of the cylinder and penetrating completely through the side thickness of the cylinder with the slot enabling the cylinder to be unrestrained to change shape under thermal expansion and contraction during catalytic combustion of a mixture of fuel and air flowing through the passages for minimizing thermally-generated stresses within the structure.

7. The combustor of claim 6 in which the passages extend radially of the cylinder.

8. The combustor of claim 6 in which the passages extend axially of the cylinder.

* * * * *